Figure 1:
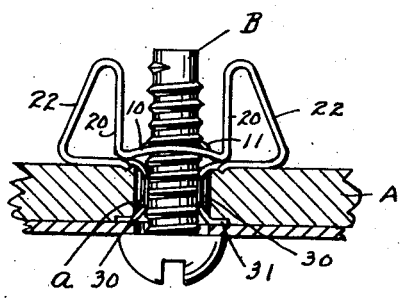

Sept. 2, 1947.   G. A. TINNERMAN   2,426,799
FASTENING DEVICE
Original Filed July 22, 1943

INVENTOR.
GEORGE A. TINNERMAN
BY
Bates, Teare, & McBean
ATTORNEYS

Patented Sept. 2, 1947

2,426,799

UNITED STATES PATENT OFFICE 2,426,799

FASTENING DEVICE

George A. Tinnerman, Cleveland, Ohio, assignor to Tinnerman Products, Inc., Cleveland, Ohio, a corporation of Ohio Original application July 22, 1943, Serial No. 495,686, now Patent No. 2,406,415, dated August 27, 1946. Divided and this application March 22, 1945, Serial No. 584,165

4 Claims. (Cl. 85—32)

This application is a division of my application No. 495,686, filed July 22, 1943, for a Fastening device which issued as Patent 2,406,415 on August 27, 1946. More particularly, the present invention, like that of the parent application, relates to a device comprising a nut and means for mounting it on a suitable support and retaining it in proper position thereof until the bolt has been applied.

The object of the invention is to provide a fastening device of the character specified, capable of ready application and efficient when applied, and adapted for economical production by simple operations from a single strip of resilient sheet material. My invention is illustrated in the drawings hereof and hereinafter more fully described and the essential novel characteristics summarized in the claims.

Figure 4:
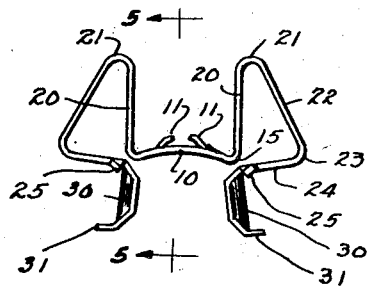
Figure 2:
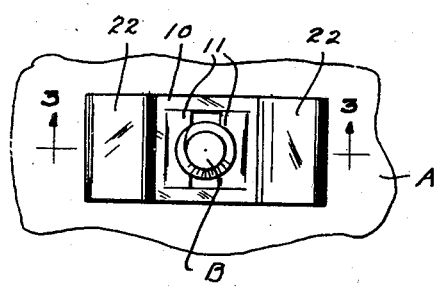
Figure 5:
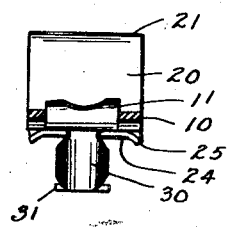
Figure 3:
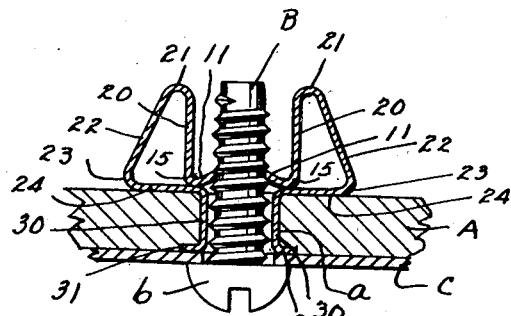
Figure 6:
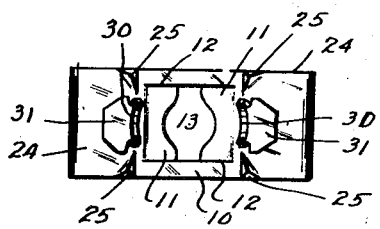

In the drawing, Fig. 1 is a side elevation of my fastening device in position on a support and in association with a plate held by a screw passing into the nut of the fastener, the plate and support being in section; Fig. 2 is a plan of the parts shown in Fig. 1; Fig. 3 is a section through the applied fastener axially of the bolt passageway, as indicated by the line 3—3 on Fig. 2; Fig. 4 is a side elevation of the fastener itself; Fig. 5 is a section of the fastener in a plane indicated by the line 5—5 of Fig. 4; Fig. 6 is a bottom plan of the fastener.

As stated, my fastener is made of a single integral piece of material. However, it is convenient to described the same by description of individual portions thereof successively.

The nut portion of the carrier is the intermediate or central portion 10, which has a bolt opening; is deformed upwardly to provide a thread-engager, and is preferably somewhat arched. As shown, the thread-engager comprises a pair of tongues 11 which are partially severed from the intermediate portion by parallel slits 12 and a central outwardly bowed passageway 13 (Fig. 6) leading from one slit to the other. The tongues 11 are raised at an acute angle to the body 10 and are oppositely warped so that their edges provide a helical turn.

From the opposite ends of the intermediate region, which I call the nut, I extend arms 20 which lie substantially parallel with each other and in the drawing are shown as extending upwardly. At the upper end of these arms are return bends 21 which connect them with downwardly extending arms 22 which flare outwardly as shown. At the lower ends of these outward arms 22 are bends 23 connecting such arms with inwardly extending arms 24. The latter arms reach substantially to the bends 15, connecting the nut portion with the upward arms 20 and are lower than such bends so that they may pass beneath them when the fastener is applied, as shown in Fig. 3, as hereinafter described.

At the inner ends of the inwardly extending portions 24 these portions are bent downwardly to form attaching legs 30 which are adapted to occupy an opening in a support. These legs 30 are formed at their lower ends with outwardly extending feet 31. These legs are preferably concave on their inner faces and convex on their outer faces, as indicated in Figs. 4, 5 and 6.

It will be seen that by reason of the normal outwardly flaring position of the portions 22 of the fastener, and the fact that the inwardly extending portions 24 are lower than the nut portion, the outwardly extending portions provide ready means by which the legs may be caused to approach each other to be mounted in the support. The approach caused by a comparatively mild pressure against the bends 23, is sufficient to bring the extremities of the feet 31 within a circle smaller than the cross section of the opening through the support. In this condition the feet may be readily passed through the support and then the legs occupying the support with the feet on the far side thereof effectively mount the fastener and hold it in position ready for the insertion of the screw.

The above-mentioned installing operation of the fastener is indicated in Figs. 1, 2 and 3, where A indicates the support, a the opening therein. Figs. 1 and 3 show such mounted fastener receiving the threaded shank of a bolt B, the enlarged head b of which clamps a plate C against the support.

The concavo-convex form of the legs above referred to not only adapts the legs to better fitting in the opening which the legs occupy but also stiffens the legs to form an effective portion holding the comparatively short outwardly projecting feet.

The horizontal arms 24 of the carrier portion of the fastener are each provided with downward prongs 25 formed by partial severance of a portion of the arm adjacent the top of the leg 30, such severed portion being bent downwardly at an acute angle, as shown in Figs. 4 and 5. These prongs readily embed themselves in the support and prevent rotation of the carrier as the screw is being turned in.

It will be apparent from the drawings and the description given that my fastener may be mounted with the legs in an opening of such size that when mounted the space within the legs is only slightly greater than the exterior of the bolt which is to occupy the thread-engager of the nut. Accordingly, when such bolt is in place, as shown in Figs. 1 and 3, it is impossible for the legs to approach each other sufficiently to release the fastener from the support.

This fastener may be cheaply manufactured from suitable resilient material, preferably spring steel, the resilience of which not only allows the legs to be brought toward each other and thereafter spread for mounting in the support, but also gives resilience to the tongues 11 of the thread-engager so that they are constrained when the screw is turned into place and thus act not only as a thread engager but as a bolt lock.

I claim:

1. A fastening device made of a single integral strip of resilient sheet material comprising a portion having an opening, the material about the opening deformed to provide a thread-engager, the fastener having a pair of arms extending from opposite ends of said portion, which arms project first at an angle to said portion and then are bent outwardly in spaced relation to the first-mentioned portion of said arms, said outwardly bent portions then extending inwardly toward the deformed region but below the same and then bent at substantially right angles away from the intermediate region to provide resiliently held legs adapted to occupy an opening in a support, said legs being concaved inwardly about the axis of the device to define between them a space for a bolt which may also occupy said thread-engager.

2. A fastener having an intermediate region with substantially parallel extensions projecting from the opposite ends of the intermediate region in the same general upward direction, said extensions being connected by outward return bends with portions which extend backwardly in spaced relation to said substantially parallel extensions and then inwardly and then turn away from the intermediate region to form legs free to be sprung inwardly and thereafter automatically spread into parallel relationship by reason of the resilience of the material, said legs being substantially at right angles to the inwardly bent portions whereby the inwardly bent portions lie in a single plane and may engage the top of a support when the legs are parallel to each other and engage the wall of an opening in the support, the intermediate region of the carrier being provided with a bolt opening, and being deformed upwardly about the bolt opening to constitute a thread-engager.

3. A combined nut and a carrier therefor comprising a single piece of resilient sheet material bent to provide the following portions, namely, an intermediate portion having an opening for the passage of a threaded bolt and being deformed upwardly about the opening to provide a thread-engager; two arms extending upwardly respectively from the opposite ends of the intermediate portion; return bends at the ends of said arms; outwardly diverging portions leading downwardly from the return bends; portions leading inwardly from the lower ends of the outwardly divergent portions substantially in a plane lying beneath said intermediate portion, and projecting legs bent from the inner ends of the inwardly extending portions in a direction substantially opposite to that of the first-mentioned arms, said legs being provided with outwardly extending feet at their lower ends which feet project less distance than the width of the space between the free legs when the same are parallel.

4. A fastener comprising a single piece of resilient sheet material bent to provide the following portions, namely, an intermediate portion having an opening for the passage of a bolt and an upward deformation of material about the opening to provide a thread-engager, two arms extending upwardly respectively from opposite ends of the intermediate portion, return bends at the ends of said arms, outwardly diverging portions leading downwardly from the return bends, straight portions leading inwardly from the lower ends of the outwardly divergent portions and adapted to lie in the same plane extending beneath said intermediate portion when attached to a support, extensions projecting from the inner ends of the inwardly extending portions in a direction substantially opposite to that of the first mentioned arms, said extensions being at substantially right angles to the inwardly extending portions and when parallel with each other forming opposite walls of a passageway commensurate with the maximum external diameter of a threaded bolt adapted to extend between the legs and occupy the thread engager, and outwardly extending feet on the lower ends of said extensions.

GEORGE A. TINNERMAN.

REFERENCES CITED

The following references are of record in the file of this patent:

UNITED STATES PATENTS

| Number | Name | Date |
|---|---|---|
| 2,252,932 | Johnson | Aug. 19, 1941 |
| 1,768,505 | Carr | June 24, 1930 |
| 1,881,836 | Mitchell | Oct. 11, 1932 |
| 2,063,181 | Miller | Dec. 8, 1936 |
| 2,303,148 | Tinnerman (a) | Nov. 24, 1942 |
| 2,064,092 | Tinnerman (b) | Dec. 15, 1936 |
| 2,244,977 | Hansman | June 10, 1941 |